Jan. 3, 1956        J. J. HEIGL        2,729,338
AIRCRAFT FUEL FILTER SYSTEM
Filed Oct. 4, 1951
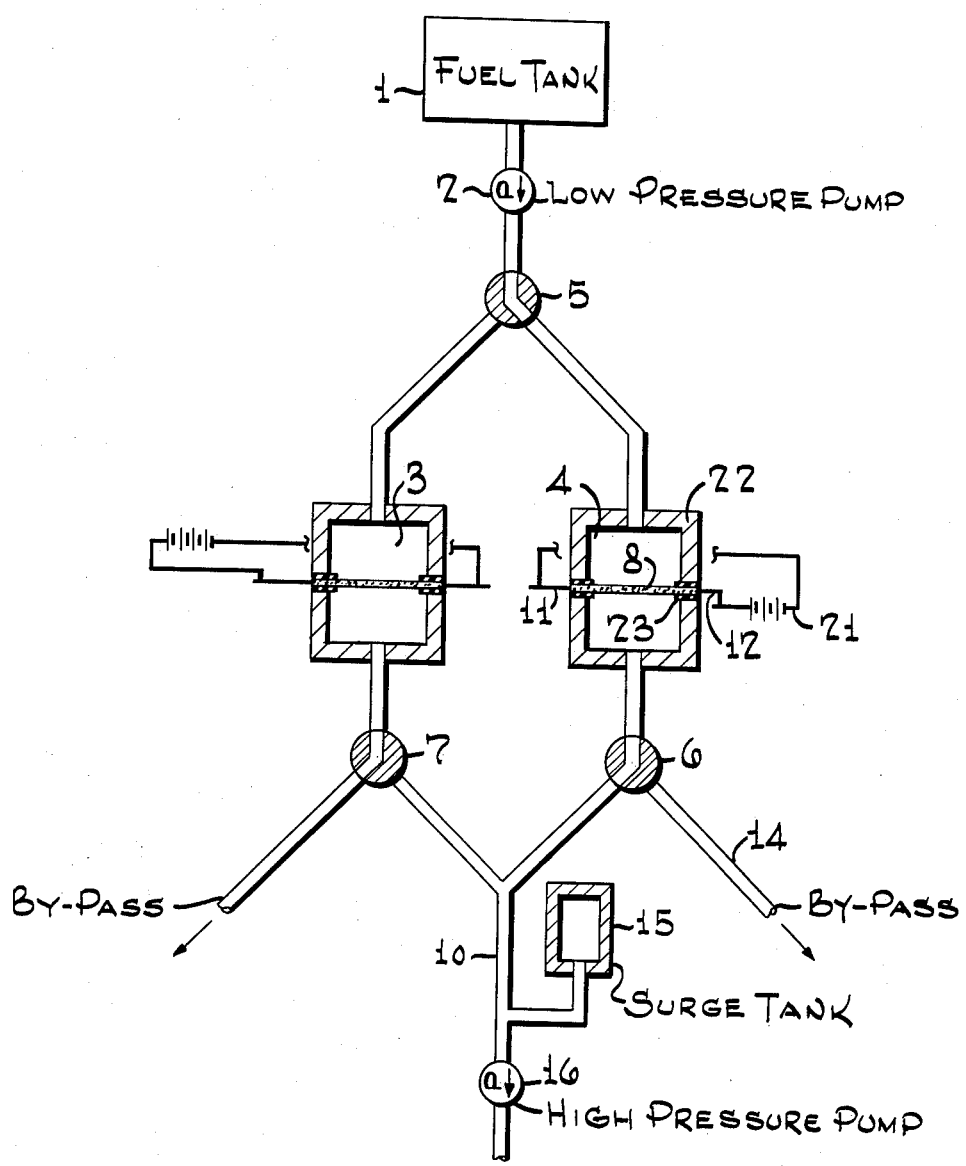
John J. Heigl    Inventor
By W. O. T Heilman Attorney United States Patent Office 2,729,338
Patented Jan. 3, 1956

2,729,338

AIRCRAFT FUEL FILTER SYSTEM

John J. Heigl, Short Hills, N. J., assignor to Esso Research and Engineering Company, a corporation of Delaware Application October 4, 1951, Serial No. 249,677

2 Claims. (Cl. 210—150.5)

This invention concerns a novel process and apparatus for the filtering of fuels in the operation of aviation engines. In accordance with this invention, a novel filter apparatus is employed in which a porous filtering element is electrically heated by conduction of electricity directly through the filtering element. By virtue of this provision the filter is uniquely adapted for the melting and liquefaction of any ice particles which tend to plug the filter. In a specific embodiment of the invention, an intermittent or cycling filter operation is disclosed particularly adapted for permitting continuous trouble-free fuel filtering operation in a system alternately employing one of two filters in which a particular de-icing and purging cycle is employed.

At the present time in the operation of aircraft especially of the jet-propelled type, a serious problem concerns the tendency of the fuel supply systems to plug under the extremely cold temperatures encountered at high flight altitudes. This problem has been localized to the filter system of the airplane. It is presently believed that traces of moisture ordinarily existing in aviation fuels freezes in the storage tanks of the airplane in flight under cold atmospheric conditions. The frozen moisture forms extremely fine particles of ice which tend to and actually do plug the fuel filters. As a result, normal fuel flow to the engine is decreased and in some cases actually cut off.

In an attempt to solve this difficulty, it has been suggested that a suitable agent such as isopropyl alcohol may be injected into the fuel system to act as a de-icing agent and to free the filters of plugging ice. Various systems have been employed using this principle. It is apparent that the necessity of carrying a sufficient supply of alcohol is in itself a disadvantage. In one system, during de-icing with isopropyl alcohol, the fuel filter is by-passed, creating the possibility for ice particles to enter the control mechanism of the engine or other parts of the engine, where complete engine failure can result. It is a particular object of this invention to overcome these and other disadvantages inherent in the presently known systems for overcoming unsatisfactory filter operation in an aircraft engine.

In accordance with this invention, a novel fuel filter is employed in which sufficient heating capacity is supplied directly to the filtering medium, either continuously or intermittently to maintain the filter free of ice plugging. This is possible by employing as a filter a body of porous material of a nature such that it may be effectively heated for de-icing purposes by passing a current of electricity through it. An example of such a material is now commercially available in the form of various porous metals and alloys. These porous metals are similar in nature to sintered glass, containing a multitude of microscopic pores, and can be obtained with pore sizes ranging from about 5 to 65 microns. The actual metal compositions available include Hastelloy, stainless steel and other nickel-chromium alloys.

Another material suitable for this application is glass which has a surface coating of an electrically conductive substance. Glass of this type has already found use in the forms of tubing and plates. In the filter application described here, glass cloth or sintered glass could be employed in which the glass fibres or particles are metallically coated. A. C. voltages of 110 or 220 volts have been used with this material and temperatures up to 660° F. are possible.

Other filtering elements that could be used for this service include filter cloths consisting of woven wire or wire interwoven with fibres of various insulating materials. Again, porous discs, plates or cylindrical shapes or pressed plastic particles surface coated with a thin layer of a metal or other electrically conductive material may be employed.

It is particularly contemplated that the filter to be employed should have pore sizes in the range of about 10 to 30 microns. Preferably, the material is constructed of a material having sufficiently high resistance so as to be adapted for resistance heating of the character contemplated. It may be necessary in some instances to employ a transformer to step down the voltage and step up the amperage of the A. C. electrical power available on any particular aircraft to obtain the proper conditions for heating a given filter element. Alternatively, if desired, batteries may be employed to provide the necessary electrical current.

It is not necessary to employ heated jackets or any of the other expedients which have previously been suggested for maintaining hot filter operation. It is particularly notable that by this technique the filter itself is directly heated, causing the heat to be supplied at the point where it is required in order to melt ice which may be held by the pores of the filter.

By employing a filter of this character in jet aircraft, it is possible to overcome problems caused by plugging of the fuel filter. This is achieved by continuous operation of the heated filter at a relatively low power consumption. Thus, for example, current is passed through the filter continuously to provide a heat source sufficient to substantially melt the quantities of ice which are ordinarily encountered in jet fuels. It should be observed that by virtue of the filter heating system employed, the heat generated is applied directly to the ice tending to plug the filter. It is not necessary, for example, to heat the entire fuel flow through the filter above icing temperatures, but simply to melt ice directly in contact with the heated filter surfaces. For this reason the low magnitude of heating requirements indicated may successfully be employed to overcome the icing problem. In most cases this can be achieved without appreciably raising the temperature of the fuel passing through the filter, and without thereby causing unreasonable heating requirements.

An attractive manner of employing this invention resides in employing two filters in parallel while continuously heating both of these filters as described. In the event that ice begins to plug one of the two filters, this plugging will cause the greater portion of fuel to flow through the other of the two filters. As a result, the heat generated in the plugged filter will be available in larger part for the melting of the plugging ice without necessity or possibility for the heat to be absorbed by the smaller quantities of fuel flowing through this filter. In this manner, operation of the two filters in parallel automatically operates to best direct the useful consumption of the heating energy applied to these filters. This system of parallel heated filter operation is particularly attractive when a simple automatic switching system is employed, operated by the pressure drop across the filters so that heating is only applied to that filter having the larger pressure drop.

Since the problem of fuel filter icing is not a continually existing problem, it is also within the scope of this invention to intermittently operate one or more of the conductively heated porous filters. For example, a simple indicating device may be employed to inform the pilot of an airplane when the fuel filter has begun to plug, as for example, by a pressure differential indicator arranged across the filter. At such times the electrical current may be supplied to the filter manually or automatically to correct the plugging condition.

In still another embodiment of this invention, two fuel filters of the character described are employed with suitable valves to control the passage of fuel through one or the other of these filters. One of the two filters may then be employed without heating until plugging is encountered. At this time the fuel may be directed to the other of the two filters and the plugged filter may then be electrically heated in order to free the filter. After a suitable period of heating, this filter can again be used, preferably by employing the first surge of fuel to the filter as a wash liquid which can be discarded. In this method of operation it is particularly desirable to use an automatic and continuous cycling system. The system will provide for fixed periods of alternate filter operation during which the inactive filter is subjected to a fixed heating period and after which the filter is purged by a small amount of fuel which is preferably discarded.

In order to more clearly bring out the nature of this invention, reference is made to the accompanying drawing in which the fuel filtering system of this invention is diagrammatically illustrated. The system depicted in the drawing shows a manner of alternately operating two filters in which the by-passed filter is electrically heated nad purged prior to reuse. The particular fuel system illustrated is one for a jet aviation engine. It is to be noted that this invention is not limited to this type of engine, but can be employed equally well in aviation reciprocating engines using carburetor or liquid injection fuel systems.

Referring to the drawing, the jet fuel tank is indicated by numeral 1. A low pressure pump 2, which is ordinarily positioned directly in the fuel tank below the level of fuel in the tank, pumps fuel from the tank at a pressure of about 20 p. s. i. g. This fuel is conventionally passed through what is known as a low pressure fuel filter and thence to a high pressure pump, a high pressure filter and the injection system of the engine. Plugging of the character herein described is ordinarily encountered in the low pressure filter positioned as indicated in the fuel line after pumping from the fuel tank. Consequently, the two filters illustrated in the drawing may be identified as the low pressure fuel filters of a jet aircraft. The two filters are designated by numerals 3 and 4. In a first cycle of operation, a valve 5 which is diagrammatically illustrated as a three-way valve is operated to permit passage of fuel from fuel tank 1 through filter 4. After passage through filter 4, a second three-way valve 6 causes the fuel to pass into a conduit leading to the high pressure pump of the system, and thence to the engine.

Filter 4, during this cycle of operation, is operated without application of electrical voltage to the porous metal filter medium 8. Operation of the filter may be continued in this manner until plugging difficulties are encountered. At this time, valve 5 may be operated to cut off flow of fuel to filter 4 and to cause the fuel to flow through filter 3. Valve 7 is also operated to permit passage of fuel from filter 3 to conduit 10 leading to the high pressure pump and the injection system of the engine. Simultaneous with the by-passing of filter 4 in this manner, a flow of electricity may be introduced to the porous filter element 8 of filter 4 across the terminals 11 and 12 of this filter. The filter element is insulated from the filter housing 22 by insulation 23. For simplicity, the electrical voltage source is illustrated in the drawing as a simple battery circuit 21. Passage of electrical current through the filter will readily cause melting of ice plugging this filter. Thereafter, valve 5 may again be operated to cause fuel to again flow through filter 4. It is preferable that valve 6 be operated just prior to operation of valve 5 to establish a fluid passage from filter 4 through by-pass conduit 14. When fuel then flows from the fuel tank back through filter 4, the first fuel coming through the filter will carry melted ice or sludge from filter 4 through by-pass 14. By-pass 14 may lead to the tail cone or after-burner of the jet engine for combustion and/or disposal. Since only a small amount of fuel is required to wash filter 4 in this manner, valve 6 may be immediately operated to again direct the flow of fuel from filter 4 to conduit 10, leading to the conventional fuel supply system of the engine. A surge tank 15 may be located before or after the high pressure pump 16 to prevent any possible fuel flow interruptions that might result from the sequence of valve operations described above.

It is particularly desirable in employing the embodiment of the invention illustrated to utilize automatic cycling valves and switches to perform the operations heretofore described. For example, it is contemplated that the periods of alternate filter operation should be for about 5 to 10 minutes. The periods of heating of the by-passed filter during inactivation may be for several minutes of the washing period of each filter just prior to reuse. It may be exceedingly short so as to permit the passage of a quart or two of fuel through the filter for washing purposes.

As described therefore, the present invention constitutes a novel type of fuel filter and the process of using this filter in aircraft to overcome filter plugging particularly caused by ice particles in the fuel. As pointed out previously, the particular fuel system described above is one for a jet aviation engine, but it is to be understood that the present invention has equal application in reciprocating aviation engines employing gasoline fuels. The filter and valve manifold illustrated in the drawing for a jet engine would serve equally well in a gasoline engine. As brought out, the filter to be employed constitutes a filter apparatus in which a filter element constructed of a porous material is employed. Suitable electrical terminals are fixed to the porous element to permit impressing an electrical voltage across the filter element to cause heating thereof. In employing this filter heating, it may be continuously or intermittently used to melt ice plugging the filter. Again many different systems of parallel filter operation and different cyclic filtering arrangements may be used.

What is claimed is:

1. In a method for supplying fuel to an aircraft engine through a confined flow path including a pair of separate filtration zones and an accumulation zone for a minor portion of filtered fuel, wherein said fuel contains ice particles, which comprises passing said fuel through said flow path and a first one of said filtration zones, removing and retaining ice particles from said fuel in said first zone; interrupting flow to and from said filtration zone while heating at least a portion of said zone to convert ice particles retained therein to water; restoring flow through said filtration zone while discharging melted ice and retained water from said zone and said flow path; passing fuel through the second one of said filtration zones and said flow path during said heating step; interrupting flow through said flow path beyond both of said filtration zones during discharge of fuel and water from either of said zones; restoring flow through the first one of said filtration zones and said flow path while performing said heating and fuel discharge steps in said second zone; accumulating filtered fuel from said flow path in said accumulation zone during passage of fuel through either of said filtration zones and said flow path, and discharging filtered fuel from said accumulation zone into said flow path during discharge of fuel and water from either filtration zone.

2. In a fuel supply system for aircraft engines, including a fuel tank, an outlet conduit from said tank, and fuel injection means for said engine, the improvement which comprises means for removing ice particles from said fuel including a multiport valve having an inlet communicating with said tank outlet conduit, and at least two outlet ports; at least two filtration devices each having an inlet conduit connection communicating with a valve outlet port of said multiport valve; an outlet conduit connection from each of said filtration devices adapted for communication with said fuel injection means for said engine; a multiport valve in each of the outlet conduit connections from said filtration devices, said valve having an inlet port communicating with said outlet conduit connection upstream from said valve, and having a pair of outlet ports of which one communicates with said outlet conduit connection downstream from said valve; a discharge conduit communicating at one end with the other one of said valve outlet ports for discharging fuel from said system, said multiport valve in each of said filtration devices outlet conduit connections being operable to provide flow through one of said filter devices from said fuel tank to said engine fuel injection means, while interrupting flow through the other of said filtration devices and, in alternate sequence, intermittently to interrupt flow from both of said filtration devices to said engine fuel injection means while discharging fuel from said system through one of said filter devices by way of a discharge conduit, and in alternate sequence through each device, a surge tank communicating with each of said filtration device conduit connections downstream from the multiport valves therein, said surge tank adapted to receive filtered fuel during flow from either of said filtration devices to said engine fuel injection means, and to discharge fuel to said engine fuel injection means when flow from both of said filtration devices is intermittently interrupted, a filter disposed in each of said filter devices which filter is of a porous medium characterized by being electrically conductive while offering heat generative resistance to an electrical voltage impressed across said medium; and an electrical circuit connected through each of said filters wherein said circuit is adapted to be energized when flow through the filter device in which said filter is disposed is interrupted by the multiport valve in the outlet conduit connection from said filter device.

References Cited in the file of this patent

UNITED STATES PATENTS

| | | |
|---|---|---|
| 1,652,173 | Lalor | Dec. 13, 1927 |
| 1,806,701 | Moreton | May 26, 1931 |
| 1,845,316 | Michailovsky | Feb. 16, 1932 |
| 2,025,570 | Clark | Dec. 24, 1935 |
| 2,103,434 | Pennebaker | Dec. 28, 1937 |
| 2,136,170 | Luertzing | Nov. 8, 1938 |
| 2,297,817 | Truxell, Jr., et al. | Oct. 6, 1942 |
| 2,373,350 | Sharples | Apr. 10, 1945 |
| 2,400,091 | Alfthan | May 14, 1946 |
| 2,536,610 | King et al. | Jan. 2, 1951 |
| 2,554,343 | Pall | May 22, 1951 |
| 2,560,220 | Graziano | July 10, 1951 |
| 2,631,731 | Stevens | Mar. 17, 1953 |

FOREIGN PATENTS

| | | |
|---|---|---|
| 280,087 | Germany | Aug. 20, 1913 |
| 338,280 | Germany | June 15, 1921 |